United States Patent [19]

Wilms

[11] 3,739,663

[45] June 19, 1973

[54] CHAIN ACTUATED PIPE TONGS

[75] Inventor: Carl Alfred Wilms, La Habra, Calif.

[73] Assignee: Byron Jackson Inc., Long Beach, Calif.

[22] Filed: Apr. 16, 1971

[21] Appl. No.: 134,553

[52] U.S. Cl. .............................................. 81/57.39
[51] Int. Cl. ........................................... B25b 13/46
[58] Field of Search ..................... 81/57.39, 57.18, 81/57.11

[56] References Cited
UNITED STATES PATENTS

| | | | |
|---|---|---|---|
| 2,989,880 | 6/1961 | Hesser et al. ....................... | 81/57.18 |
| 2,879,680 | 3/1959 | Beeman et al. ................. | 81/57.18 X |
| 3,203,284 | 8/1965 | Norrick ............................. | 81/57.34 |

Primary Examiner—James L. Jones, Jr.
Attorney—Donald W. Banner, William S. McCurry and John W. Butcher

[57] ABSTRACT

A chain actuated well pipe tong having a body adapted to receive pipe and pipe gripping means mounted with the body, the pipe gripping means having jaws adapted to positively converge into gripping engagement with pipe and to retract away from such pipe in response to relative rotation of the pipe gripping means with respect to the body. The improvement comprises chain sprocket means connected to rotate the pipe gripping means with respect to the body, chain means connected with the sprocket means, and linearly extending actuator means connected with the chain means and the body for pulling the chain means to rotate the sprocket means and actuate the pipe gripping means.

6 Claims, 13 Drawing Figures

INVENTOR
CARL A. WILMS

INVENTOR
CARL A. WILMS

CHAIN ACTUATED PIPE TONGS

BACKGROUND OF THE INVENTION

The present invention pertains to tongs for drill pipe, well casing, well tubing and the like and more particularly pertains to improved means for actuating pipe gripping mechanisms in back-up tongs and driving tongs.

Pipe gripping tongs of the nature shown and described herein have been previously developed as shown in U.S. Pat. Nos. 3,550,485, 3,548,692, 3,540,326, 3,518,903, 3,507,174, 3,483,774, 3,180,186, 2,879,680, 2,705,614, 2,650,070, 2,649,283, 2,618,468 and 2,573,212

SUMMARY OF THE INVENTION

The invention provides a pipe gripping tong of strong and compact structure in which pipe may be firmly and positively gripped to resist torque in either direction.

The invention also provides an improved pipe gripping tong having a chain actuated pipe gripping means which will positively grip large size pipe with relatively low stresses imposed in the pipe gripping actuating mechanism.

The invention further provides a chain linked pipe gripping actuating mechanism which is selectively operated and controlled by hydraulic pressure.

The invention also provides a pipe gripping tong of improved simplicity with the actuating mechanism being totally enclosed and protected within the tong body housing.

The foregoing and other provisions are attained in a pipe tong having a body adapted to receive pipe with pipe gripping means mounted with the body and having jaws adapted to positively converge into gripping engagement with pipe and to retract away from such pipe in response to relative rotation of the pipe gripping means with respect to the body. The improvement comprises a chain sprocket means connected to rotate the pipe gripping means with respect to the body, chain means connected with the sprocket means and linear actuator means connected with the chain means and with the body for pulling the chain means to rotate the sprocket means and actuate the pipe gripping means.

Though the invention is herein shown and described in incorporation with a pipe back-up tong, it is to be noted that the essential features of the invention may also be incorporated in a power pipe rotating tong in accordance with the disclosure in the application for U.S. Pat. of Bela Geczy and Carl A. Wilms, filed Apr. 16, 1971, Ser. No. 134,554, entitled CHAIN DRIVEN, SPINNING MAKE UP AND BREAK OUT TONG, now U.S. Pat. No. 3,691,875, issued Sept. 19, 1972.

DESCRIPTION OF THE PREFERRED EMBODIMENTS

Figure 1:
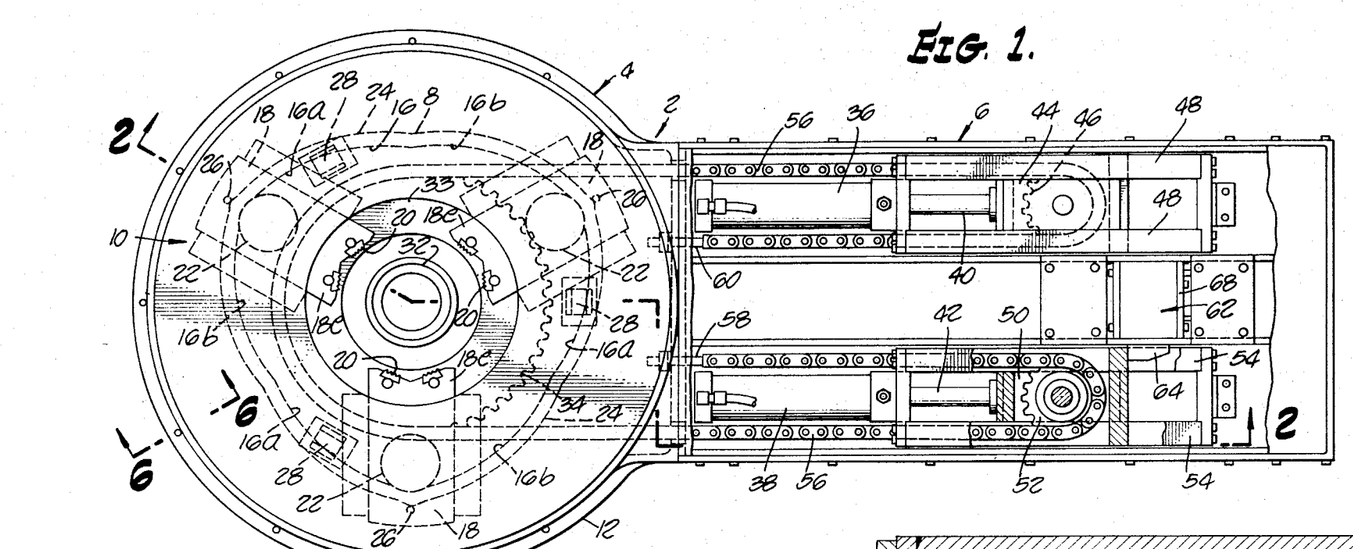
FIG. 1 is partially sectional plan view of one embodiment of a pipe back-up tong in open position.
Figure 2:
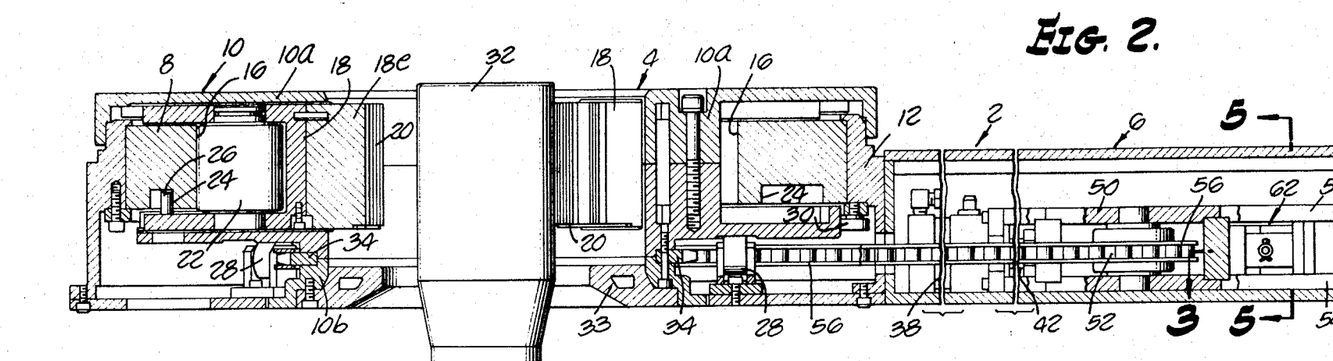
FIG. 2 is a sectional view taken along the line 2—2 of FIG. 1.

Referring to FIGS. 1-8 and more particularly to FIGS. 1 and 2, there is shown a back-up tong apparatus having a body 2 which comprises a pipe gripping head 4 connected with an actuator section 6. Gripping head 4 includes a cam ring 8 concentrically mounted about a jaw carrying ring 10 and within a circular housing 12. Carrying ring 10 is a composite structure as shown, including an upper plate 10a and a lower plate 10b suitably connected with fasteners and index pins.

Figure 6:
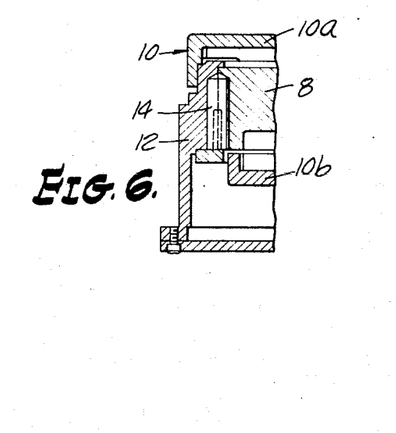
FIG. 6 is a partially sectional view taken along the line 6—6 of FIG. 1.

As best shown in FIGS. 2 and 6, cam ring 8 is rigidly mounted within housing 12 and angularly oriented and indexed by means of dowell pins 14. Defined within cam ring 8 is a composite cam face 16 comprising cam faces 16a and reverse cam faces 16b as shown. Carrying ring 10 is equipped with a plurality of pipe gripping jaws 18 equipped with pipe gripping dies 20 which jaws are reciprocally mounted in ring 10 in radial relation to the center of gripping head 4. Cam follower rollers 22 are rotatably mounted within each of the jaws 18 and disposed to abut cam face 16 and thereby radially position each jaw 18 inwardly commensurate with the angular position of the camming face 16 with cam ring 8 and the radial dimension of cam face 16 at each angular increment.

Cam ring 8 also defines a follower face 24 which extends around cam ring 8 coincident with and parallel to cam face 16 as shown. Each of the jaws 18 is equipped with a retracting follower means 26, shown as a pin in FIG. 2, which is mounted with respect to each roller 22 to be in abutment with follower face 24 and thereby retract each jaw outwardly in response to the face profile as carrying ring 10 is rotated.

Carrying ring 10 is vertically supported in rotatable relation within housing 12 by bearing means 28, shown as rollers in FIGS. 1 and 2, and is laterally supported in such rotatable relation by a plurality of circumferentially disposed bearing means 30, also shown as rollers in FIG. 2. Bearing means 28 and 30 are shown as rollers, for example; other types of bearings also being suitable as will be apparent from later description.

As can be seen, the radial travel of jaws 18 coincides and is limited to the radial profiles of cam face 16 and follower face 24. In order to accommodate different sizes of pipe 32, as shown in FIGS. 1 and 2, each of jaws 18 may be equipped with a jaw extension 18e which is provided of appropriate radial dimension when the tong is utilized to grip a particular size or range of sizes of pipe. In this connection a guide ring 33 of appropriate interior diameter is concentrically mounted with carrying ring 10 to center pipe 32 within gripping head 4 and thereby avoid interference of the pipe with jaws 18 when extensions 18e are utilized.

As shown in FIGS. 1 and 2, a chain drive sprocket 34 is concentrically mounted with carrying ring 10 to forcibly rotate the carrying ring as later described.

The related components of pipe gripping head 4 as previously described are of generally conventional construction, with exception of sprocket 34, and further details may be obtained by reference to U.S. Pat. Nos. 3,507,174 and 3,548,692, specifically incorporated herein.

Referring now to FIGS. 1-5, actuator section 6 is seen to have mounted therein first and second piston and cylinder linear hydraulic pressure operated actuators 36 and 38, hereinafter referred to as actuator cylinders or cylinders. Cylinders 36 and 38 include push rods 40 and 42, respectively, which project away from gripping head 4 and drive sprocket 34. A crosshead assembly 44 (having a transfer chain sprocket 46 rotatably mounted therein) is mounted on the distal end of push rod 40 and reciprocatively mounted in a guide track assembly 48. A crosshead assembly 50 (having a transfer chain sprocket 52 rotatably mounted therein) is mounted on the distal end of push rod 42 and reciprocatively mounted in a guide track assembly 54.

A continuous length of a chain 56 is connected from an anchor 58 connected at the juncture of head 4 and actuator section 6, about transfer sprocket 52, drive sprocket 34 and transfer sprocket 46 to another anchor 60 also connected at the juncture of head 4 and section 6. The dimensions and disposition of cylinders 36 and 38 and sprockets 34, 46 and 52, as provided and shown, are such that chain 56 extends tangentially from each sprocket and parallel to push rods 40 and 42 whereby the extensive force from either push rod will cause parallel tension in the chain.

Figures 7, 8:
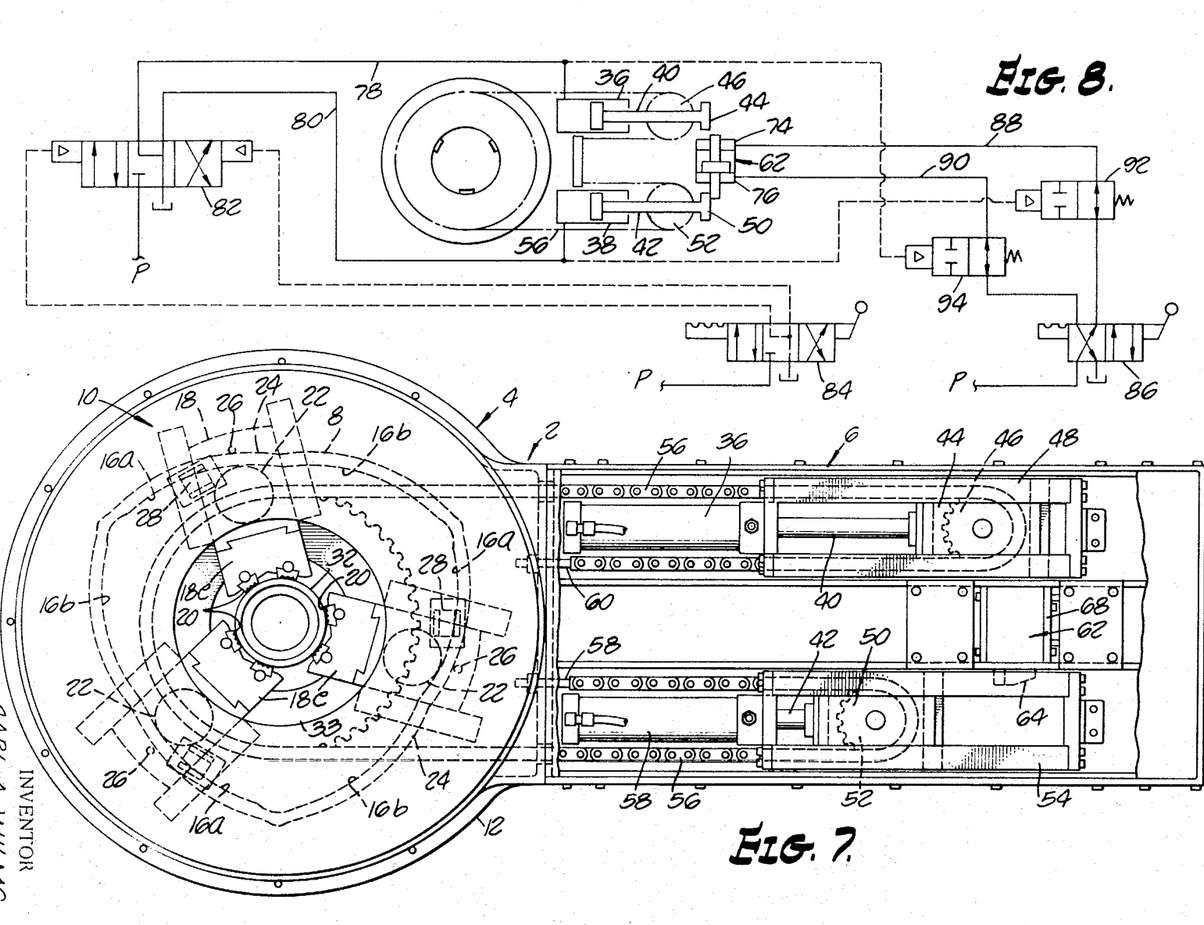
FIG. 7 is the same view as FIG. 1 but showing the back-up tong in pipe engaged position.
FIG. 8 is a schematic illustration of the hydraulic control and actuating system of the tong shown in FIGS. 1-7.

The dimensions of drive sprocket 34, cam face 16, and cylinders 36 and 38 are also such that when push rods 40 and 42 are equally distended, as shown in FIG. 1, cam rollers 22 are at the maximum radial position permitted by cam face 16 and follower face 24, and jaws 18 are fully retracted away from pipe 32. As push rod 40 and crosshead 44 are distended further, as shown in FIG. 7, push rod 42 and crosshead 50 are retracted a corresponding distance and carrying ring 10 is rotated clockwise, causing rollers 22 to ride radially inwardly along cam faces 16a and forcing jaws 18 inwardly into gripping engagement with pipe 32. In such instance it is to be noted that jaws 18 are rotating while converging into pipe gripping position. Reversal of push rods 40 and 42 to the position shown in FIG. 1 fully retracts jaws 18 away from pipe 32.

Full extension of push rod 42 causes counterclockwise rotation of carrying ring 10 and movement of cam rollers 22 inwardly along cam faces 16b. The jaws are thereby rotated counterclockwise and converge into pipe gripping engagement with pipe 32.

In the embodiment as shown in FIGS. 1-7, push rod 40 is extended to rotate jaws 18 clockwise into converged engagement with pipe 32 to back up pipe 32 against counterclockwise or left-hand torque, as when breaking out pipe joints during the removal of a string of pipe from a well. Conversely, push rod 42 is extended to rotate jaws 18 counterclockwise into converged engagement with pipe 32 to back up the pipe against clockwise or right-hand torque, as when making up pipe joints during the running of a string of pipe into a well.

It is now seen that carrying ring 10 may be rotated in either direction to converge jaws 18 into pipe gripping engagement, depending on the direction of the torque for which back up is needed. The jaws, when returned to retracted position from either direction, need be in fully retracted position with the push rods 40 and 42 equally distended as shown in FIG. 1. To insure that such position is reached automatically, an alternating or shuttle limit stop means 62 is provided, as shown in FIGS. 1-5, which is actuated in conjunction with the hydraulic control system shown in FIG. 8. As shown in FIGS. 1 and 8, stop means 62 is positioned to project a stop dog 64 in the path of crosshead 50 to limit the extension of the same. Thus, when push rod 42 is distended to return jaws 18 and rollers 22 in a counterclockwise direction from the engaged to retracted position, the crosshead is positioned by stop dog 64 to place jaws 18 in fully retracted position. Under conditions when push rod 40 is distended to return jaws 18 and rollers 22 in a clockwise direction from an engaged to retracted position, the shuttle stop means would first have been shifted to project a stop dog 64a (FIG. 3) in the path of crosshead 44 and concurrently retract stop dog 64 whereby crosshead 44 would be stopped in correct position for full retraction of jaws 18 as previously described with reference to crosshead 50 and stop dog 64.

Figure 3:
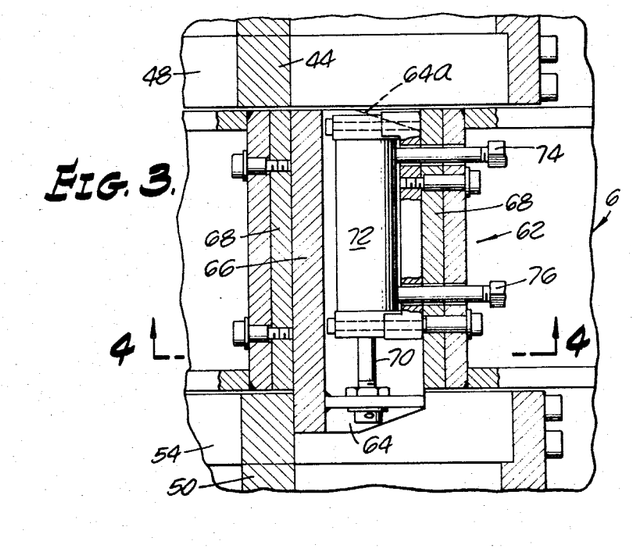
FIG. 3 is a sectional view taken along the line 3—3 of FIG. 2 and showing a reverse shuttle valve and position limit mechanism.
Figure 4:
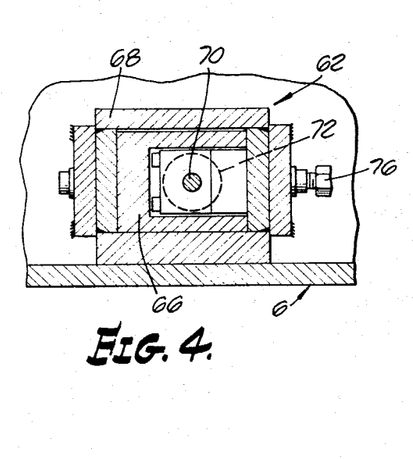
FIG. 4 is a sectional view taken along the line 4—4 of FIG. 3.
Figure 5:
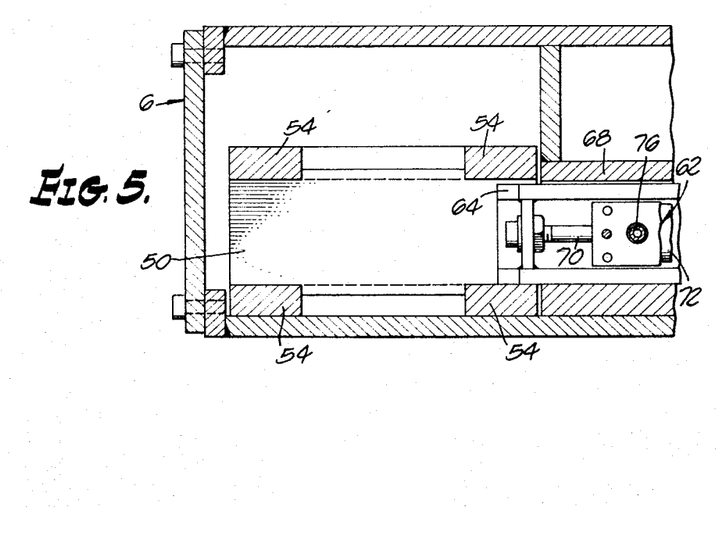
FIG. 5 is a partially sectional view taken along the line 5—5 of FIG. 2.

As shown in FIGS. 3-5, limit stop means 62 includes a carrier slide 66 slidably mounted in a guide frame 68 and connected through a piston rod 70 to a double acting piston and cylinder arrangement 72. Carrier slide 66 defines a stop dog 64 and 64a at each end. Cylinder 72 is mounted to the guide frame 68. As shown in FIGS. 1 and 3, fluid pressure introduced into a fitting 74 serves to extend piston rod 70 and move the carrier slide 66 and associated stop dog 64 into position to limit the movement of crosshead 50. Introduction of fluid pressure into a fitting 76 serves to retract piston rod 70 and move carrier slide 66 and associated stop dog 64a into position to limit the movement of crosshead 44 for the purposes of fully retracting jaws 18 as previously described.

As best seen in FIG. 8, fluid pressure such as hydraulic pressure P is selectively introduced into cylinder 36 through a conduit 78 or into cylinder 38 through a conduit 80 from a selector control valve 82. Control valve 82 is of a three-position type with pressure bleed to sump from both cylinders 36 and 38 when in off or neutral position. Since valve 82 is large and handles elevated fluid pressures, requiring considerable force for actuation, the valve is actuated by a similarly operated pilot valve 84 from pressure source P as shown. Pilot valve 84 may be remotely located from valve 82, as desired. A switch valve 86 connected from pressure source P through a conduit 88 into fitting 74 and through a conduit 90 into fitting 76 serves to alternately switch shuttle stop means 62 to limit the travel of the crossheads for correct positioning as previously described.

As a safety and expedient operating feature, a normally open lock out valve 92 is connected into conduit 88 and actuated to close in response to pressure applied to cylinder 36. A similar lock out valve 94 is connected into conduit 90 and actuated to close in response to pressure applied to cylinder 38 as shown. When so connected, pressure applied to either cylinder 36 or cylinder 38 will prevent shifting of shuttle means 62 without regard to the position of switch valve 86.

In operation, switch valve 86 is positioned to cause gripping actuation of gripping jaws 18 in the rotational direction desired. Pilot valve 84 is then switched to cause actuation and release of jaws 18 as desired through alternate application of pressure to cylinder 36 or cylinder 38.

Following is a description of the embodiment of the invention as shown in FIGS. 9–13. The elements of this embodiment having construction and operation relating to elements of the embodiment shown in FIGS. 1–8 bear the same numbers in a 200 plus series.

Figure 9:
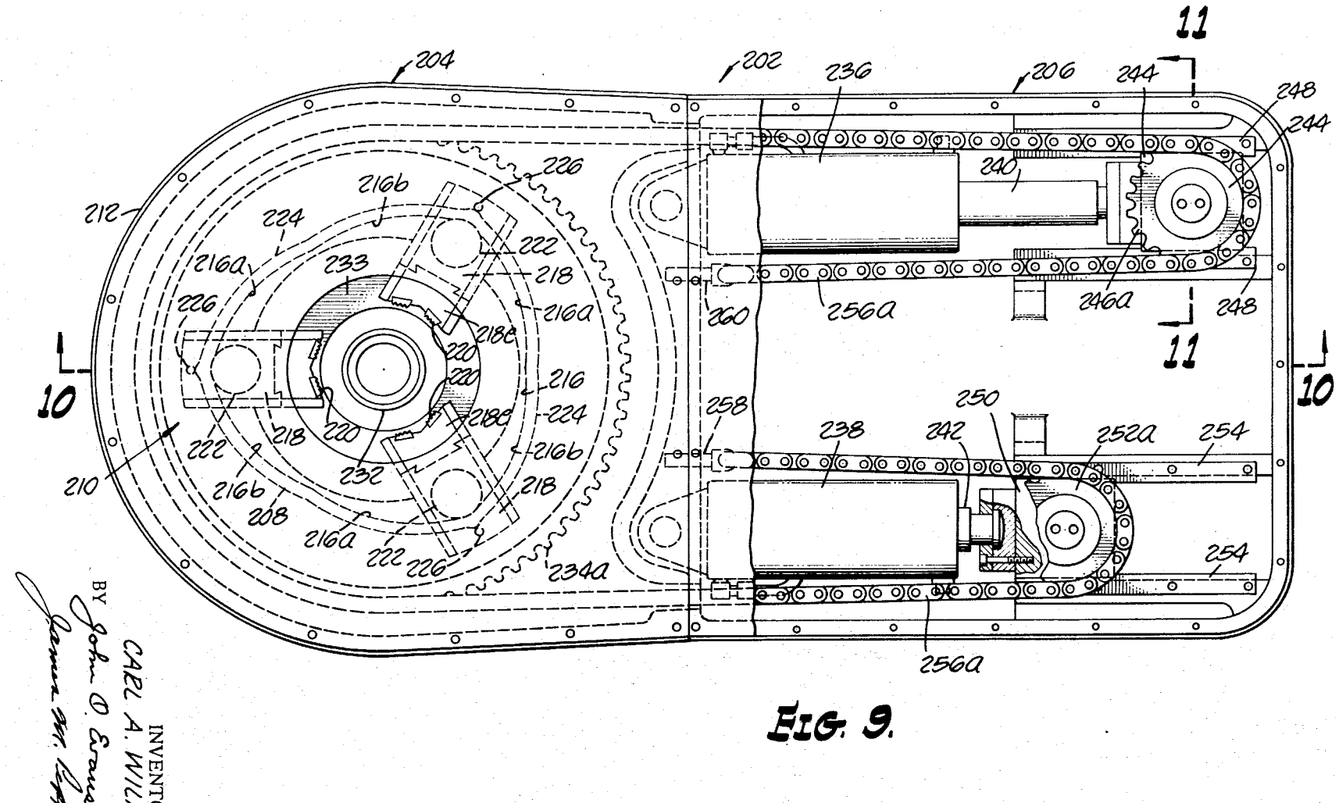
FIG. 9 is a partially sectional plan view of another embodiment of a pipe back-up tong in open position.
Figure 10:
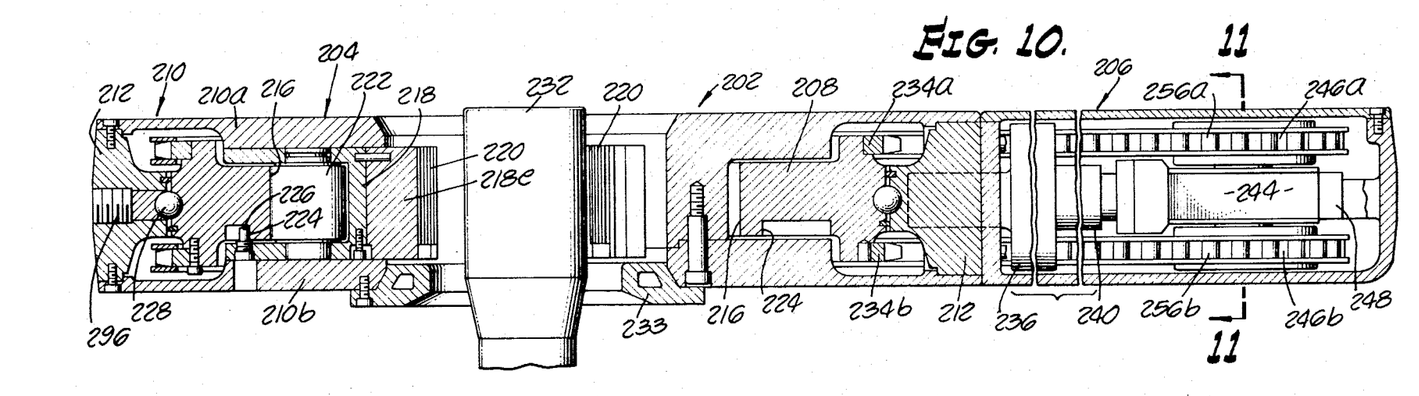
FIG. 10 is a sectional view taken along the line 10—10 of FIG. 9.
Figure 11:
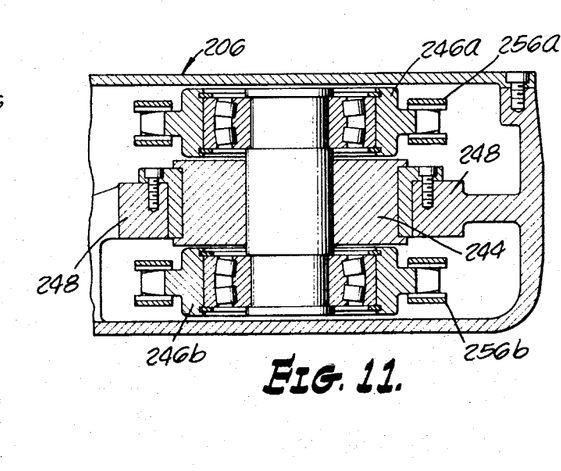
FIG. 11 is a sectional view taken along the line 11—11 of FIGS. 9 and 10.

Referring to FIGS. 9 and 10, the back-up tong shown has a housing 202 including a pipe gripping head 204 connected with an actuator section 206. Gripping head 204 includes a cam ring 208 concentrically and rotatably mounted about a stationary jaw carrying ring 210 and within a circular housing 212. Jaw carrying ring 210 is a composite structure as shown including an upper member 210a connected with a lower member 210b which are attached to and form a portion of housing 212.

Cam ring 208 is rotatably mounted within housing 212 and supported axially and radially by bearing means 228, illustrated as ball bearings disposed in a race jointly defined within housing 212 and around cam ring 208. As shown in FIG. 10 the bearings are installed in the race through a filler means 296 which includes a bearing filler port later closed by a bearing support plug and a threaded retainer plug.

Defined within cam ring 208 is a composite cam face 216 comprising cam faces 216a and 216b as shown. Carrying ring 210 is equipped with a plurality of pipe gripping jaws 218 having pipe gripping dies 220 and reciprocally mounted in carrying ring 210 in radial relation to the center of gripping head 204. Cam follower rollers 222 are rotatably mounted within each of the jaws 218 and disposed to abut cam face 216 and thereby radially position each jaw 218 inwardly commensurate with the angular position of the cam ring 208 and the radial dimension to the face of cam face 216 at each arcuate increment.

Cam ring 208 also defines a follower face 224 which extends around cam ring 208 coincident with and parallel to cam face 216 as shown. Each of jaws 218 is equipped with a jaw retracting follower means 226, shown as a pin in FIG. 10, which is mounted with each jaw 218 in respect to each roller 222 to be positioned in abutment with follower face 224 at all times and thereby retract each jaw outwardly in response to the face profile as cam ring 208 is rotated. As can be seen, the radial movement of jaws 218 coincides with and is limited to the radial profiles of cam face 216 and follower face 224.

Figure 12:
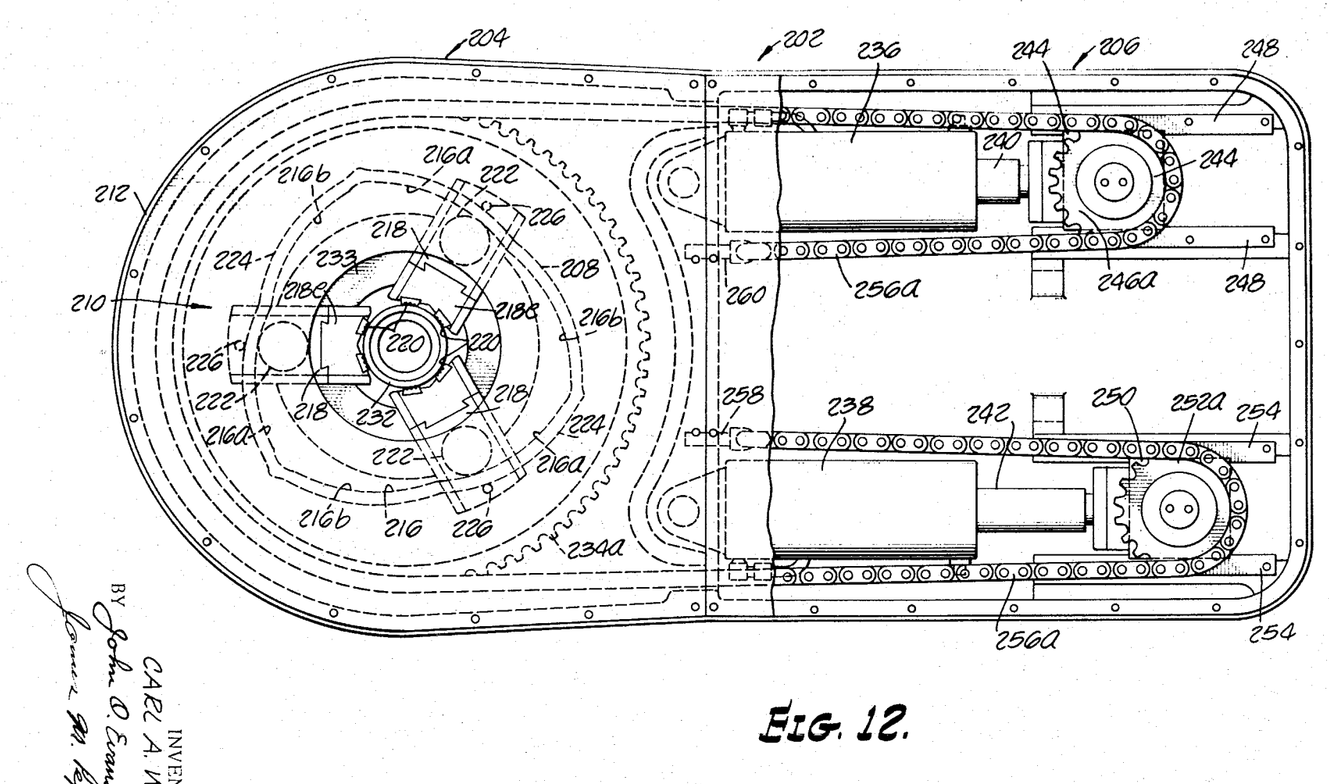
FIG. 12 is the same view as FIG. 9 but showing the back-up tong in pipe engaged position.

In order to accommodate different sizes of pipe 232, shown in FIGS. 9, 10 and 12, each of jaws 218 may be equipped with a jaw extension 218e which is provided of appropriate radial dimension when the tong is utilized to grip a particular size or range of sizes of pipe. In related connection, a guide ring 233 is concentrically mounted with carrying ring 210 to center pipe 232 within gripping head 204 and thereby avoid interference of the pipe with jaws 218 when extensions 218e are utilized.

As shown in FIGS. 9 and 10, chain drive sprockets 234a and 234b are concentrically mounted with cam ring 208 for the purpose of causing forcible rotation of the cam ring as later described.

Referring now to FIGS. 9–12, actuator section 206 has mounted therein first and second piston and cylinder linear fluid pressure operated actuators 236 and 238, respectively. Cylinders 236 and 238 include push rods 240 and 242, respectively, which project away from gripping head 204 and drive sprocket 234 a and 234b. A crosshead assembly 244 (having transfer chain sprockets 246a and 246b rotatably mounted therewith) is mounted on the distal end of push rod 240 and reciprocatively mounted in a guide track assembly 248. A crosshead assembly 250 (having transfer chain sprockets 252a and 252b rotatably mounted therewith) is mounted on the distal end of push rod 242 and reciprocatively mounted in a guide track assembly 254.

Two respective continuous lengths of chain 256a and 256b are connected from an anchor 258 connected at the juncture of head 204 and actuator section 206, about transfer sprockets 252a and 252b, drive sprockets 234a and 234b and transfer sprockets 246a and 246b to another anchor 260 also connected to the juncture of head 204 and section 206. The dimensions and disposition of cylinders 238 and 240, drive sprockets 234a and 234b, sprockets 246a and 246b and sprockets 252a and 252b as provided and shown are arranged in a manner causing chains 256a and 256b to extend tangentially from each sprocket and substantially parallel to push rods 240 and 242 whereby the extending force from each push rod will cause parallel tension in the chains for optimum effectiveness and minimum lateral stress on the cylinder and crosshead assemblies.

The dimensions of drive sprockets 234, cam face 216 and cylinders 236 and 238 as provided and shown are arranged in a manner causing cam rollers 222 to be at the maximum radial dimension permitted when push rod 240 is at the maximum extended position. Jaws 218 are then in fully retracted position. As push rod 242 is extended and push rod 240 is retracted (as shown in FIG. 12) cam ring 208 is rotated counterclockwise, causing rollers 222 to ride radially inwardly along cam faces 216a and forcing jaws 218 inwardly into gripping engagement with pipe 232.

It is to be noted that, in the embodiment of FIGS. 9–12, full extension and retraction of push rods 240 and 242 serve to move only cam faces 216a in rolling abutment with cam rollers 222 to move jaws 218 from a fully retracted to a fully extended and gripping position. Cam faces 216b in this embodiment are utilized only at such time as cam ring 208 is rotationally reindexed with respect to carrying ring 210, in which event the roles of cylinders 236 and 238 are reversed in converging and retracting jaws 218. Such expedient is not necessary for proper operation but is available if desired.

It is important to note that jaws 218 in the embodiment of FIGS. 9–12 remain rotationally stationary while converging and retracting in response to rotation of cam ring 208 in either direction; hence it is not material to proper operation of the tong whether cam faces 216a or 216b are used or cylinders 236 or 238 are used, as appropriate, to bring jaws 218 into converged and gripping position to resist torque in either direction.

The principal operational advantage offered by such feature is that dies 220 remain rotationally stationary and converge directly into engagement with pipe 232 rather than rotate and converge into such engagement. Such direct converging eliminates rotational and frictional contact with the pipe which could cause wear and dulling of the dies.

Figure 13:
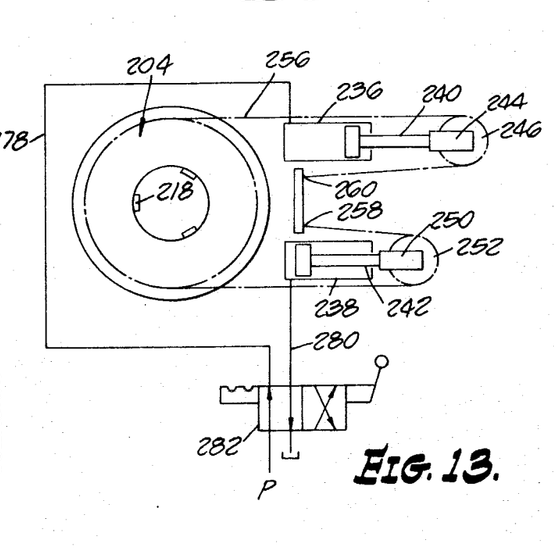
FIG. 13 is a schematic illustration of the hydraulic control and actuating system of the tong shown in FIGS. 9-12.

The hydraulic power and control system for the embodiment of FIGS. 9–12 is shown in FIG. 13. Fluid pressure from a source P is introduced into cylinder 236 through a conduit 278 or into cylinder 238 through a conduit 280 from a selector control valve 282. Valve 282 is shown as a two-position reverse valve to alternately pressure cylinders 236 and 238 and bleed such cylinders, respectively, to oscillate jaws 218 from retracted to engaged position and return. Valve 282 may also be pilot operated from a remote position as previously described for valve 82 in FIG. 8.

In operation, pressure P is applied through valve 282 to alternately extend push rod 240 or push rod 242 and thereby bring pipe gripping jaws 218 into gripping engagement with successive sections of pipe 232 to back up the pipe against rotation while making up or breaking out successive threaded joints of the pipe.

The foregoing description and drawing will suggest other embodiments and variations to those skilled in the art, all of which are intended to be included in the spirit of the invention as herein set forth.

That being claimed is:

1. A back-up pipe tong comprising a body defining an opening adapted to receive pipe, pipe gripping means mounted in said body, said pipe gripping means including gripping jaws movably mounted in a jaw carrier about said opening, cam means about said opening, one of said jaw carrier and said cam means being mounted for rotation about said opening and the other being fixedly mounted to said body, said cam means being shaped and operatively connected to said jaws to positively converge them from retracted positions into gripping engagement with pipe in said opening in response to rotation of said rotatably mounted one of said jaw carrier and said cam means in one direction, means for returning said jaws to said retracted positions upon reverse rotation of said rotatably mounted one of said jaw carrier and said cam means, a chain sprocket operatively connected to said rotatably mounted one of said jaw carrier and said cam means to effect rotation thereof upon rotation of said sprocket with relation to said body, a pair of linear, pressure operated actuator cylinder means carrier by said housing and disposed in mutually parallel relation at one side of said chain sprocket, each of said cylinder means having a chain transfer sprocket disposed in the plane of said chain sprocket, a sprocket drive chain having one end attached to said body between said pair of actuator cylinder means and engaged, in sequence, around one of said chain transfer sprockets, said chain sprocket and the other of said chain transfer sprockets, with the other end of said chain being attached to said body between said pair of actuator cylinder means, the portions of said chain that run between said respective sprockets and between said transfer sprockets and said body being parallel to said pair of actuator cylinder means, and means for selectively applying power to said actuator cylinder means to effect rotation of said chain sprocket in opposite directions.

2. A back-up pipe tong as defined in claim 1 wherein said jaw carrier is mounted for rotation about said opening and said cam means is fixedly mounted to said body, said cam means is shaped, upon rotation of said jaw carrier in one direction, to move said jaws from a first position in which said jaws are in said gripping engagement with pipe in said opening, through a second position in which said jaws are in said retracted positions, to a third position in which said jaws are again in gripping engagement with pipe, and, upon rotation of said jaw carrier in the opposite direction, to move said jaws from said third position, through said second position, to said first position to actuate said jaws in reverse order, and control means including limit stop means for selectively stopping said said chain sprocket in said second position as it is rotated in either direction between said first and third positions.

3. A back-up pipe tong as defined in claim 2 wherein said limit stop means acts on said actuator cylinder means.

4. A back-up pipe tong as defined in claim 2 wherein said cam means is also shaped and operatively connected to said jaws for positively returning them from pipe-gripping positions to retracted positions.

5. A back-up pipe tong as defined in claim 1 wherein said cam means is mounted for rotation about said opening and said jaw carrier is fixedly mounted to said body, whereby said jaws are moved between retracted positions and pipe-gripping positions while being maintained rotatively stationary about said opening.

6. A back-up pipe tong as defined in claim 5 wherein said cam means is also shaped and operatively connected to said jaws for positively returning them from pipe-gripping positions to retracted positions.

* * * * *